(12) United States Patent
Römer (10) Patent No.: US 9,016,787 B2
(45) Date of Patent: Apr. 28, 2015

(54) VEHICLE SEAT

(71) Applicant: Faurecia Autositze GmbH, Stadthagen (DE)

(72) Inventor: Bernd Römer, Ludwigsburg (DE)

(73) Assignee: Faurecia Autositze GmbH, Stadthagen (DE)

( * ) Notice: Subject to any disclaimer, the term of this patent is extended or adjusted under 35 U.S.C. 154(b) by 39 days.

(21) Appl. No.: 13/858,591

(22) Filed: Apr. 8, 2013

(65) Prior Publication Data

US 2013/0264853 A1 Oct. 10, 2013

(30) Foreign Application Priority Data

Apr. 7, 2012 (DE) .......................... 10 2012 008 533

(51) Int. Cl.
 *B60N 2/12* (2006.01)
 *B60N 2/30* (2006.01)
(52) U.S. Cl.
 CPC ................ *B60N 2/12* (2013.01); *B60N 2/3031* (2013.01); *B60N 2/3065* (2013.01)
(58) Field of Classification Search
 USPC .................. 297/317, 316, 216.1, 216.18, 341, 297/378.12, 334
 See application file for complete search history.

(56) References Cited

U.S. PATENT DOCUMENTS

| | | | | |
|---|---|---|---|---|
| 4,241,894 A | | 12/1980 | Okuyama | |
| 4,312,537 A | * | 1/1982 | Lindenberg | 297/317 |
| 4,787,674 A | * | 11/1988 | Inaba et al. | 297/317 |
| 4,863,209 A | * | 9/1989 | Deegener | 296/68.1 |
| 5,358,308 A | * | 10/1994 | Judic et al. | 297/316 |
| 6,152,533 A | * | 11/2000 | Smuk | 297/341 |
| 6,183,032 B1 | * | 2/2001 | Champ | 296/65.03 |
| 6,543,848 B1 | | 4/2003 | Suga et al. | |

(Continued)

FOREIGN PATENT DOCUMENTS

| | | |
|---|---|---|
| DE | 66 01 250 U | 2/1969 |
| DE | 29 14 780 A1 | 10/1979 |

(Continued)

OTHER PUBLICATIONS

German Office Action in German Priority Application No. 10 2012 008 533.8, filed Apr. 7, 2012, Office Action dated Dec. 11, 2012 (5 pages).

(Continued)

*Primary Examiner* — Jose V Chen
(74) *Attorney, Agent, or Firm* — Shlesinger, Arkwright & Garvey LLP (57) ABSTRACT

Vehicle seat has at least a front foot, a rear foot, a four-link configuration having four link parts coupled to one another via hinge points, and a compensation spring. Front foot and rear foot are accommodated in a longitudinal rail in a longitudinally adjustable manner, and the rear foot is releasable from the longitudinal rail after unlocking. Vehicle seat is movable forward from a seating position having a locked rear foot, after rear foot is unlocked, into a functional position with adjustment of four-link configuration, and with at least temporary assistance from the compensation spring. Vehicle seat has a locking apparatus which automatically locks or clamps together at least two link parts of the four-link configuration in order to compensate for production-related tolerances. Four link parts may include a seat part, a backrest part, a receiving part, and a coupling rocker.

20 Claims, 4 Drawing Sheets

(56) References Cited

U.S. PATENT DOCUMENTS

| | | | | |
|---|---|---|---|---|
| 6,578,917 | B1 * | 6/2003 | Aubert et al. | 297/317 |
| 6,679,536 | B1 * | 1/2004 | Sonnenberg et al. | 296/65.09 |
| 6,805,406 | B1 * | 10/2004 | Jansen | 297/328 |
| 6,899,392 | B1 * | 5/2005 | Saberan et al. | 297/334 |
| 6,932,409 | B2 * | 8/2005 | Falchero et al. | 296/65.09 |
| 7,152,921 | B2 * | 12/2006 | Saberan | 297/336 |
| 7,172,253 | B2 | 2/2007 | Haverkamp | |
| 7,172,255 | B2 | 2/2007 | Wanke | |
| 7,273,243 | B2 | 9/2007 | Prugarewicz | |
| 7,390,059 | B2 | 6/2008 | Brockschnieder et al. | |
| 7,390,063 | B2 | 6/2008 | Behrens | |
| 7,393,056 | B2 * | 7/2008 | O'Connor | 297/378.12 |
| 7,410,219 | B2 | 8/2008 | Kraft et al. | |
| 7,413,251 | B2 * | 8/2008 | Link | 297/334 |
| 7,416,254 | B2 | 8/2008 | Jennings | |
| 7,425,038 | B2 | 9/2008 | Deptolla | |
| 7,461,900 | B2 | 12/2008 | Lange | |
| 7,479,749 | B2 | 1/2009 | Gerding et al. | |
| 7,490,900 | B2 | 2/2009 | Szczudrawa | |
| 7,506,939 | B2 | 3/2009 | Brockschnieder et al. | |
| 7,517,022 | B2 | 4/2009 | Habedank et al. | |
| 7,673,944 | B2 | 3/2010 | Behrens | |
| 7,746,011 | B2 | 6/2010 | Gerding et al. | |
| 8,313,144 | B2 | 11/2012 | Holdampf | |
| 8,388,065 | B2 * | 3/2013 | Harden | 297/317 |
| 8,474,910 | B2 * | 7/2013 | Kammerer | 297/334 |
| 8,602,495 | B2 * | 12/2013 | Jeong et al. | 297/334 |
| 8,950,782 | B2 | 2/2015 | Dobruia et al. | |
| 2006/0138839 | A1 | 6/2006 | Ryan et al. | |
| 2007/0138847 | A1 | 6/2007 | Gundall et al. | |
| 2011/0037304 | A1 | 2/2011 | Kammeerer | |
| 2013/0285428 | A1 * | 10/2013 | Livesey et al. | 297/317 |

FOREIGN PATENT DOCUMENTS

| | | |
|---|---|---|
| DE | 40 10 451 A1 | 10/1991 |
| DE | 698 35 019 T2 | 11/2006 |
| DE | 10 2005 060 444 A1 | 6/2007 |
| DE | 20 2010 004 599 U1 | 7/2010 |

OTHER PUBLICATIONS

Aug. 19, 2013 Office Action in German Application No. 10 2013 102 673.7, filed Mar. 15, 2013, A German Priority Application for U.S. Appl. No. 13/858,744 (6 pp.).

Dec. 29, 2013 Office Action in KR Appl. No. 2013-0036499, filed Apr. 3, 2013, equivalent to DE 10 2013 102 673.7, filed Mar. 15, 2013, DE priority appl. of U.S. 13/858,74 (7 pp.).

* cited by examiner

VEHICLE SEAT

CROSS-REFERENCE TO RELATED APPLICATIONS

This application claims the priority of German patent application no. 10 2012 008 533.8, filed Apr. 7, 2012, and which is incorporated herein by reference.

This application relates to applicant's concurrently filed U.S. application Ser. No. 13/858,744.

FIELD OF THE INVENTION

The invention relates to a vehicle seat having a front foot, a rear foot, a four-link configuration having four link parts which are coupled to one another via four hinge points, and a compensation spring.

BACKGROUND OF THE INVENTION

These types of vehicle seats allow on the one hand a longitudinal adjustment on a longitudinal rail, and on the other hand, an adjustment between a seating position and a completely or partially folded forward functional position, which may be a cargo or easy entry position, for example.

For this purpose, the vehicle seat has a four-link configuration having four link parts and four hinge points which connect the link parts. An angled seat part and a backrest part, for example, are generally provided as link parts, the seat part being provided for accommodating a seat cushion, which may also be supported on the lower area of the backrest part. The backrest part may represent the entire backrest or a lower portion of the backrest. In these types of articulated structures, for example a lower receiving part, which is generally rigidly coupled to a front foot or which itself forms the front foot, and a coupling rocker between the receiving part and the backrest part, for example, are used as additional link parts.

In addition to its front foot, the vehicle seat is generally accommodated with a rear foot in the longitudinal rail, whereby, for example, the front foot may be lockable in the longitudinal positions. The rear foot is accommodated with a locking apparatus on the longitudinal rail, which may be unlocked for folding or pivoting forward.

The pivot motion from the seating position initially leads in a first upward partial path into a middle position, and is generally assisted by a compensation spring so that the user does not have to overcome the entire weight of the seat. This is followed by a further partial path into the functional position, which may occur completely or partially automatically, for example.

For this purpose, the compensation spring is provided between two parts of the four-link configuration, for example between the coupling rocker and a suitable location on the seat part, and is already tensioned in the seating position.

However, production-related tolerances in the individual components, in particular also the front foot and rear foot and their locking apparatuses, generally result in a certain play in the individual parts of the four-link configuration. In particular, the action of the compensation spring results in twisting of the link parts of the four-link configuration having tolerances. This may cause, for example, twisting of the feet in the longitudinal rail, in particular also tilting of the rear foot in the longitudinal rail, for example. Such tilting of the feet may result in interfering resistance during the longitudinal adjustment and in the sliding motion, and the seat may jerk and become jammed.

OBJECTS AND SUMMARY OF THE INVENTION

An object of the invention is to provide a vehicle seat which provides ease of operation and reliable adjustability between the positions.

This object is achieved by a vehicle seat according to Claim 1. The subclaims describe preferred further embodiments.

Thus, according to the invention a locking apparatus for adaptively or automatically locking or clamping at least two link parts of the four-link configuration is provided. The adaptive locking apparatus may in particular be provided between the backrest part and the coupling rocker. The adaptive locking apparatus locks or clamps the two components together in order to compensate for or set production-related tolerances.

For this purpose, a spring apparatus may advantageously be provided which pretensions the adaptive locking apparatus in one direction, so that due to the spring tension the adaptive locking apparatus fixes the play in one direction and locks or clamps in this position. If the play between the components subsequently changes, for example due to a different application of force of the compensation spring or different angular positions of the four-link configuration, the adaptive locking apparatus advantageously readjusts to eliminate this play.

As the lower link part, a receiving part is advantageously provided which is not a part of the front foot or rigidly coupled to the front foot, but, rather, is hinged to the front foot. The receiving part thus has a hinge point having the seat part, for example, and another hinge point having the coupling rocker, in addition to a hinge point for a small pivot motion on the front foot. In particular a very small angular range of the pivot motion on the front foot of less than 5°, preferably less than 1°, may thus be provided. For this purpose, the receiving part advantageously has a rear and a front contact surface by means of which the receiving part in each case comes to rest on the longitudinal rail at the end of an angular range, or also on the front foot. The receiving part may thus in particular also be angled or curved.

According to this preferred embodiment, the adaptive locking apparatus and the receiving part may be coordinated with one another. In particular, fairly large angular changes of the adaptive locking apparatuses may result in small angular changes of the receiving part, with a basically adjustable gearing-down. Thus, only a very small pivot of the receiving part on the front foot is possible, and the user perceives no wobbling or rattling in the four-link configuration.

The adaptive locking apparatus may in particular be formed by a rotatable cam having a run-up surface. The run-up surface thus has an increasing radius when the cam rotates in order to provide a contact surface for a toggle link, for example, due to the rotation of the cam. The toggle link is provided between the two components to be clamped, and advantageously has two toggle levers, which in each case are hinged to one of the two parts of the four-link configuration and are connected to one another at a toggle pivot situated outside the connecting line of the hinge points of the parts, so that the toggle pivot is pushed out in a defined manner when the two parts are moved. Production-related tolerances thus result in a change in the position of the toggle link configuration, and thus a change in the contact surface of the toggle link configuration on the cam. Thus, for example due to pretensioning toward the run-up direction, i.e., toward the larger radius, the cam may automatically readjust if play with respect to the toggle link configuration results. Small changes in the toggle link may result in fairly large angular changes on the cam; i.e., translating to greater rotational motions of the cam is made possible by the run-up surface.

According to one particularly preferred embodiment, the cam is configured in such a way that it does not have an interfering or jamming effect on the adjustment motion of the vehicle seat. For this purpose, the cam may have an indentation which temporarily accommodates the toggle link during the adjustment motion toward the functional position. Thus, if the backrest is pivoted forward after the rear foot is unlocked, the toggle link preferably descends, engages in the indentation in the cam, and turns the cam in the direction opposite its spring force until an intermediate position, for example the middle position, is reached, and the toggle link moves out of the indentation and subsequently back into the provided functional position for contact with the run-up surface of the cam, so that the two end positions are lockable due to the clamping, and the intermediate positions are not blocked.

The invention thus allows several advantages. Adaptive locking or clamping is possible in order to fix production-related tolerances and the play between the components. Rattling of the four-link configuration, in particular also of the rear and/or front lock(s) on the longitudinal rail, may thus be effectively prevented. However, no tilting or jamming in the longitudinal rail occurs.

The embodiment according to the invention thus allows production-related tolerances in this system to be captured or "locked up." The force of the compensation spring is accommodated or "locked up" in the adaptive locking apparatus and optionally the easily pivotable receiving part without this being discernible by the user.

The invention is explained in greater detail below with reference to the appended drawings, in which:

DETAILED DESCRIPTION OF THE INVENTION

Figure 1:
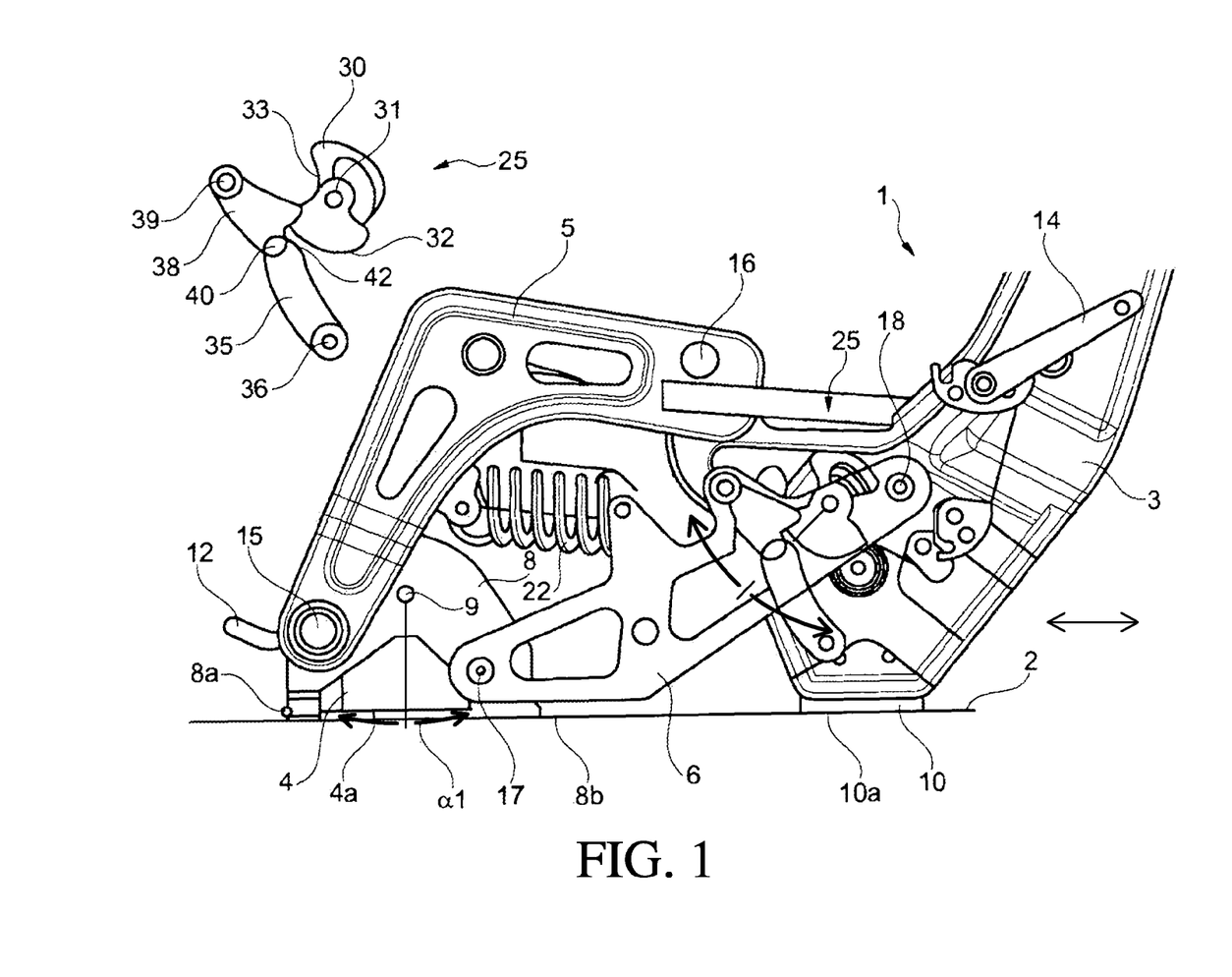
FIG. 1 shows a vehicle seat according to the invention in the seating position.
Figure 2:
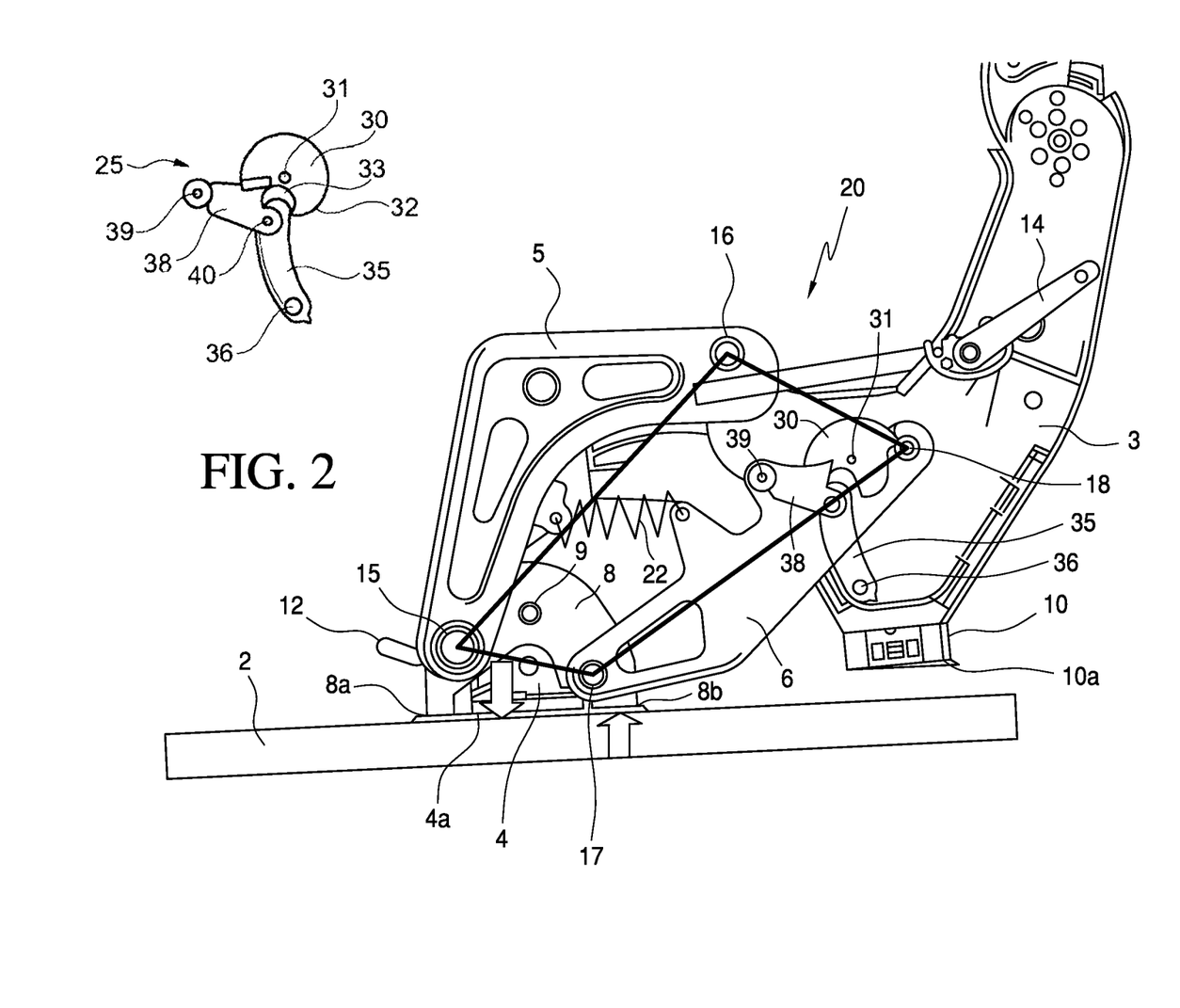
FIG. 2 shows the vehicle seat of FIG. 1 after the rear foot has been unlocked and forward folding has begun.
Figure 3:
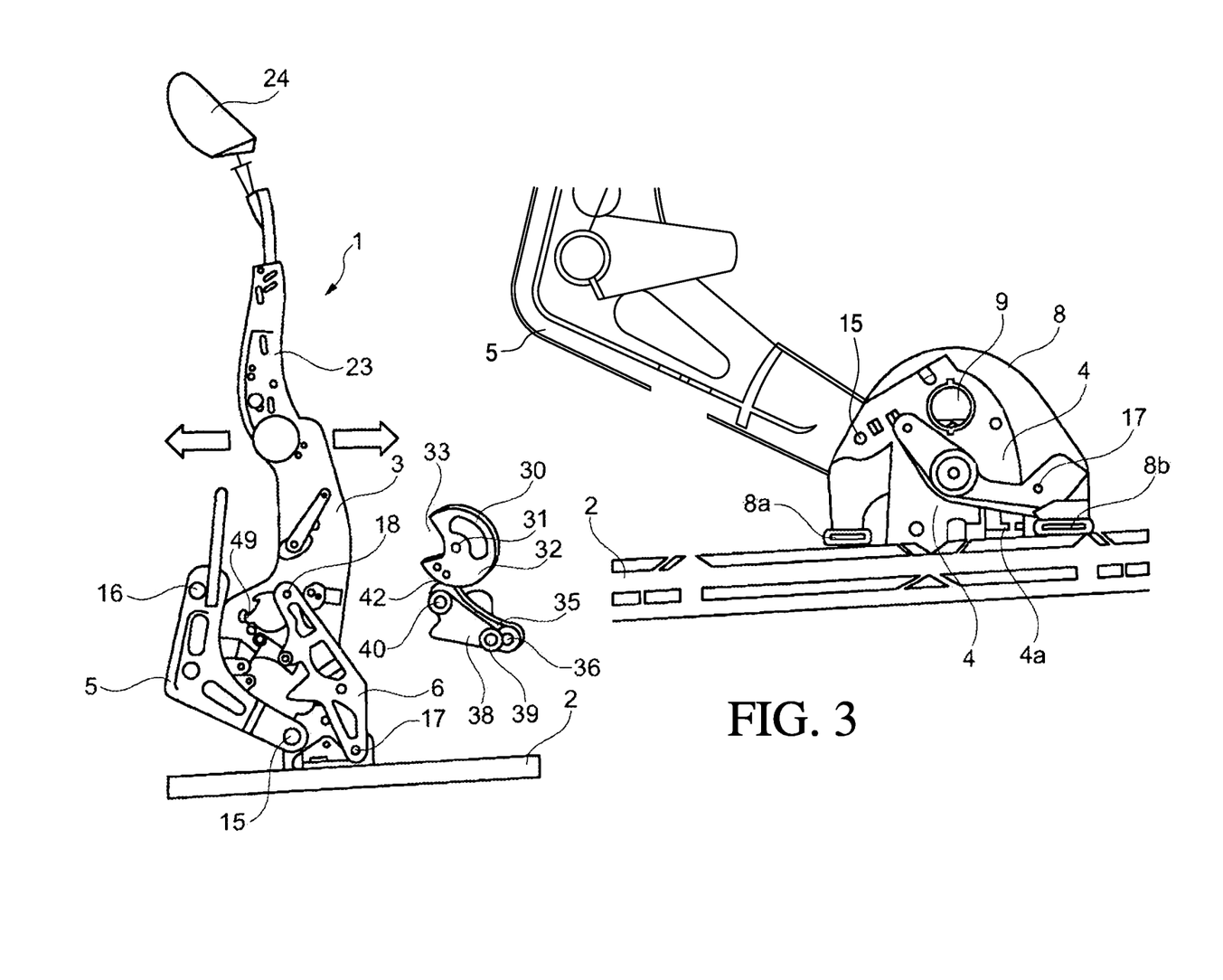
FIG. 3 shows the vehicle seat in the completely forward-folded functional position.
Figure 4:
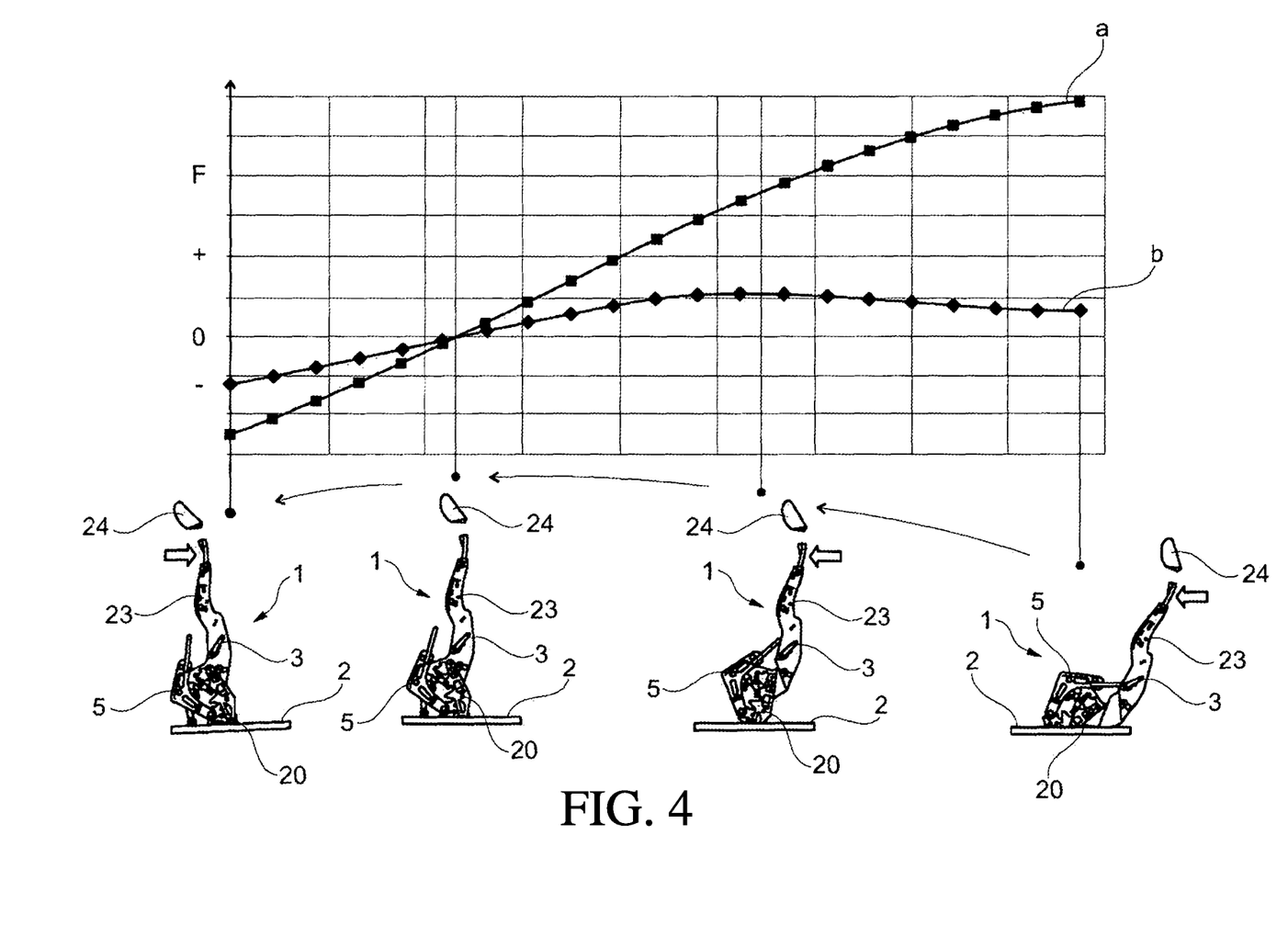
FIG. 4 shows the adjustment of the inventive vehicle seat from the seating position into the functional position, together with a diagram illustrating the operating force to be applied, with and without a compensation spring in the positions.

A vehicle seat 1 according to the invention is illustrated only partially in FIGS. 1 and 2, and is illustrated completely in FIGS. 3 and 4, for example. The vehicle seat 1 is longitudinally adjustable on a longitudinal rail 2, and is lockable in each of its longitudinal positions. According to FIG. 4 the vehicle seat 1 is adjustable between a seating position shown in FIG. 1 and a functional position shown in FIG. 3; in principle, these various positions may be assumed in any longitudinal position if the vehicle seat 1 at this location is not prevented from being adjusted, for example by another seat or an object.

The vehicle seat 1 according to the invention has a lower backrest part 3 (seat back part), a front foot 4, a seat part 5, and a coupling rocker 6. On the front foot 4 a receiving part 8 is mounted so as to be pivotable at a pivot point 9. A rear foot 10 is provided at the lower end of the lower backrest part 3. The front foot 4 is lockable in the longitudinal rail 2 via a locking apparatus 4a, not illustrated here in greater detail, and is unlockable by an unlocking lever 12 to be activated by the driver, so that after the unlocking, the entire vehicle seat 1 is adjustable in the longitudinal direction. The rear foot 10 is releasably locked in a locking apparatus 10a which is unlockable by a second unlocking lever 14 in order to pivot the lower backrest part 3 upwardly after the unlocking.

The seat part 5 is hinged to the receiving part 8 at a first hinge point 15, and is hinged to the lower backrest part 3 at a second hinge point 16; the coupling rocker 6 is hinged to the receiving part 8 at a third hinge point 17, and is hinged to the lower backrest part 3 at a fourth hinge point 18. A four-link configuration 20 is thus provided, having the following four link parts: backrest part 3, seat part 5, coupling rocker 6, and receiving part 8, as well as the hinge points 15, 16, 17, 18, as is also apparent in particular from FIG. 2.

Thus, after the rear foot 10 has been unlocked, according to FIG. 2 the lower backrest part 3 is pivoted upwardly and forward, with guiding by the four-link configuration 20. Since the receiving part 8 is not fixed to the front foot 4, but, rather, is pivotable about its hinge point 9 in an angular range of $\alpha_1 = 0.7°$, for example, there is no fixed coupling of the four-link linkage 20 on the front foot 4.

Between the seat part 5 and the coupling rocker 6, a compensation spring 22 is suspended as a pretensioned tension spring, and thus pulls the quadrangle, i.e., the four-link linkage 20, shown in FIG. 2 upwardly into the upright position; the compensation spring 22 thus acts in such a way that the coupling rocker 6 is pivoted upwardly about its hinge point 17. The compensation spring 22 is thus used for partial compensation of the inherent weight of the vehicle seat 1, and thus simplifies the adjustment motion by the user according to FIG. 4, from the seating position shown at the right into the functional position, as is also apparent in particular from the diagram in FIG. 4. The diagram schematically shows the force to be applied by the user by pushing the top backrest 23 forward from the rear, on the one hand in the curve a without the compensating effect of the compensation spring 22, and on the other hand in the curve b with this compensating effect of the compensation spring 22. An upper backrest part 23 is mounted on the lower backrest part 3, for example in an adjustable articulated joint, or in a rigid manner. The user thus pushes with a force F on the upper backrest part 23, for example at the upper edge thereof beneath a headrest 24, thus pivoting the four-link linkage 20 upwardly and forward according to the quadrangle illustrated in FIG. 2.

The lower curve b in the diagram in FIG. 4 shows that the force F to be applied by the user, from the seating position on the right into the subsequent intermediate position and the subsequent (third from the right) middle position of the vehicle seat 1, remains essentially constant, and drops to zero only as the middle position is approached. In contrast, without compensation a very high force F must be applied, which subsequently drops steeply toward the middle position.

Going further from the middle position into the functional position shown at the far left in FIG. 4, in both curves the algebraic sign of the force reverses; i.e., the vehicle seat is automatically moved into the functional position, since in this case its center of gravity drops; the compensation spring 22 acts approximately in the opposite direction, so that arrival in the functional position, i.e., the locking, also causes a slight deceleration. Thus, upon the subsequent resetting from the functional position shown at the left in FIG. 4 into the middle position, it is once again necessary for the user to apply the appropriate force, whereupon the seat is subsequently automatically placed in the functional position.

The compensation spring 22 assists with the force to be applied by the user by means of a small lever length, i.e., close to the articulated joints 15, 17; the compensation spring 22 should therefore be configured with a correspondingly large elastic force, and already acts in the locked seating position in FIG. 1. Since all parts of the vehicle seat are engineered with production-related tolerances, this force by the compensation spring 22 also causes twisting or tilting of the components with respect to one another, which, depending on the tolerance, may initially also result in jamming of the front foot 4 and/or the rear foot 10 in the longitudinal rail 2.

According to the invention, an adaptive locking apparatus 25 is therefore provided which brings about adaptive locking or automatic clamping between the coupling rocker 6 and the lower backrest part 3. The adaptive locking apparatus 25 has the following:

a cam 30 which is supported on the lower backrest part 3 at a center of rotation (axis) 31, and which on its outer periphery has a run-up surface 32 which radially increases in the direction of rotation of the cam 30, and an indentation 33 adjacent to the run-up surface 32, a first toggle lever 35 which is hinged to the lower backrest part 3 at a center of rotation 36, and a second toggle lever 38 which is hinged to the coupling rocker 6 at a center of rotation 39, wherein the two toggle levers 35, 38 are hinged to one another at a toggle pivot 40.

The cam 30 is pretensioned with respect to the lower backrest part 3 by a spring 34, for example a spiral spring 34, in the clockwise direction according to this illustration.

On one of the toggle levers 35, 38—according to the embodiment shown, on the first toggle lever 35—a contact surface 42 for contact with the run-up surface 32 is provided. The cam 30 is pretensioned in the clockwise direction by the spiral spring 34 in such a way that the run-up surface 32 is tensioned toward the contact surface 42 with enlargement of the radius of the run-up surface, so that the run-up surface 32 is readjusted in each case when play or free space forms between the run-up surface 32 and the contact surface 42 of the toggle pivot 40.

Pivot motions of the lower backrest part 3 with respect to the coupling rocker 6 cause the toggle pivot 40 to buckle outwardly or inwardly, so that the toggle pivot 40 is offset with respect to the connecting line of the hinge points 36, 39 of the toggle levers 35, 38, respectively; thus, play forms between the contact surface 42 and the run-up surface 32 when the four-link configuration is adjusted. This play between the run-up surface 32 and the contact surface 42 may be compensated for in each case by a pivot motion of the cam 30.

When the four-link linkage 20 is subsequently adjusted from the seating position in FIG. 1 into the position in FIG. 2 and moved further upwardly, the toggle pivot 40 is pushed out upwardly to the right, i.e., toward the cam 30, since the distance between the centers of rotation 36 and 39 is reduced during this adjustment. Thus, the toggle pivot 40 buckles outwardly with respect to the cam 30.

Production-related tolerances in the articulated link configuration are present in particular in the rear foot 10 or its lock on the seat rail 2, and on the front foot 4 or its locking apparatus 4a on the seat rail 2, since the rear foot and front foot should be smooth-running, i.e., should not jam even during unlocking. Production tolerances in the rear foot 10 or its locking apparatus 10a initially result in play in the lower backrest part 3, and thus, a rotary motion about the hinge point 18. Similarly, production tolerances in the front foot 4 or in its locking apparatus 4a result in play in the front foot 4 and the receiving part 8.

Since the four-link configuration 20 is pivotable about the hinge point 9 of the lower receiving part 8 within the angular range a1, motions of the quadrangle, i.e., the four-link configuration 20, shown in FIG. 2 occur even in the locked seating position in FIG. 1 due to the tolerances in the components, and are captured by this type of pivot motion about the hinge point 9.

Due to the action of the compensation spring 22, the production-related tolerances thus result in corresponding (generally small) rotational motions of the link parts of the four-link linkage 20. According to the invention, these tolerances are captured or locked up by the configuration of the adaptive locking apparatus 25 and the pivotable receiving part 8, as explained below:

In FIG. 1, slight rotations of the parts of the four-link linkage 20, in particular the lower backrest part 3, the compensation spring 6, and the receiving part 8, result in a corresponding motion of the toggle pivot 40 with respect to the center of rotation 31. In the seating position in FIG. 1, the contact surface or run-up surface 32 of the cam 30 abuts against the contact surface 42 of the toggle lever 35. Mechanical translation is achieved in such a way that rotations of the lower backrest part 3 and/or of the coupling rocker 6 and/or of the receiving part 8 result in fairly large variations in the distance of the toggle pivot 40 from the center of rotation 31; by appropriate selection of a slight inclination of the run-up surface 32, large rotational motions of the cam 30 may thus be achieved. Small adjustments, for example of the receiving part 8 in its angular range a1, thus result in large rotational motions of the cam 30, for example in the range of 20°-40°. Automatic clamping of the cam 30 to the toggle link system 35, 38, 40 may thus be achieved, so that play is eliminated in the seating position in FIG. 1. In the process, the receiving part 8 correspondingly pivots; however, since the receiving part 8 is not directly locked to the seat rail 2, but instead is locked via the front foot 4, this pivoting of the receiving part 8 does not cause any tilting in the front foot 4 or its lock 4a. Thus, in the seating position in FIG. 1, production-related tolerances and clamping by the compensation spring 22 are captured in this system.

During the forward pivoting from FIG. 1 to FIG. 2, the cam 30 lifts off from the contact surface 42 of the first toggle lever 35, and the toggle lever 35 enters the indentation 33 in the cam 30, as is apparent from FIG. 2. The toggle lever 35 thus rotates the cam 30 in the counterclockwise direction, i.e., against the spring action of the cam. In the transition to the functional position in FIG. 3, the toggle lever 35 then descends once more relative to the cam 30, which results from the pivot kinematics of the four-joint linkage 20. The toggle lever 35 thus moves out of the indentation 33, so that the cam 30, with relaxation of its spring 34, subsequently rotates in the clockwise direction once again, and according to the functional position in FIG. 3 the toggle lever 35 with its contact surface 42 once again abuts against the run-up surface 32. The relative positions of the first toggle lever 35 and of the cam 30 in the positions in FIG. 1 and FIG. 3 are thus similar; however, the second toggle lever 38 pivots at its hinge point 39 relative to the cam 30 and away from the toggle lever 35 to the right, so that the hinge point 39 of the second toggle lever reaches the vicinity of the hinge point 36.

The toggle lever mechanism, i.e., the entire adaptive locking apparatus, thus allows adaptive locking or a clamping effect in the two end positions, i.e., the seating position in FIG. 1 and the functional position in FIG. 3, and also allows descent of the toggle lever 35 with subsequent engagement in the indentation 33, in order to pivot the cam 30, followed by descent to release the cam 30 in the transition into the functional position in FIG. 3.

In addition, in the two end positions, i.e., the seating position in FIG. 1 and the functional position in FIG. 3, stable automatic or adaptive locking is achieved to compensate for the play or the production-related tolerances.

A high level of stability is achieved due to the receiving part 8, since the receiving part 8 is able to absorb forces via its contact surface 8a or 8b in addition to the front foot 4.

In principle, with appropriate shaping the second toggle lever 38 may be configured for contact with the cam 30 instead of the first toggle lever 35.

Under normal driving conditions, no play or rattling motion occurs, since here as well the adaptive locking device 25 removes or cancels out play.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:
1. Vehicle seat, comprising:
  a) a front foot, a rear foot, a four-link configuration having four link parts which are coupled to one another via four hinge points, and via a compensation spring;
  b) the vehicle seat having a locking apparatus which automatically locks together at least two link parts of the four-link configuration;
  c) the front foot and the rear foot being accommodated in a longitudinal rail in a longitudinally adjustable manner, and the rear foot being releasable from the longitudinal rail after unlocking of the locking apparatus;
  d) the four link parts of the four-link configuration include a seat part, a backrest part, a receiving part, and a coupling rocker;
    i) the seat part is connected to the receiving part at a first, lower hinge point and the seat part is connected to the backrest part at a second, upper hinge point; and
    ii) the coupling rocker is connected to the receiving part at a third, lower hinge point and the coupling rocker is connected to the backrest part at a fourth, upper hinge point; and
  e) the vehicle seat being movable forward from a seating position having a locked rear foot, after the rear foot is unlocked, into a functional position with adjustment of the four-link configuration, and with assistance from the compensation spring.
2. Vehicle seat according to claim 1, wherein:
  a) the locking apparatus is configured for locking between the backrest part and the coupling rocker.
3. Vehicle seat according to claim 1, wherein:
  a) the compensation spring is provided between the seat part and the coupling rocker.
4. Vehicle seat according to claim 1, wherein:
  a) a fifth hinge point is provided, and the receiving part is directly or indirectly hinged to a front foot at the fifth hinge point and is pivotable at the fifth hinge point; and
  b) the receiving part has contact surfaces for contact with at least one of the longitudinal rail and the front foot.
5. Vehicle seat according to claim 4, wherein:
  a) an adjusting motion of the locking apparatus corresponds to a pivot motion of the receiving part at the front foot; and
  b) the pivot motion of the receiving part is geared down with respect to the adaptive adjustment motion of the locking apparatus.
6. Vehicle seat according to claim 5, wherein:
  a) a pivot motion of the receiving part on the front foot corresponds to an outward angle of the toggle link configuration and a pivot angle of the cam which is larger than the outward angle of the toggle link.
7. Vehicle seat according to claim 1, wherein:
  a) the front foot is lockable in at least one longitudinal position by the locking apparatus.
8. Vehicle seat according to claim 1, wherein:
  a) the rear foot is formed or rigidly mounted on the backrest part.
9. Vehicle seat according claim 1, wherein:
  a) the locking apparatus has:
    i) a cam which is hinged to a link part of the four-link configuration and which has a radially increasing run-up surface on its outer side in a peripheral direction; and
    ii) a toggle pivot, and a toggle link configuration having a first toggle lever and a second toggle lever which are articulatedly connected to one another at the toggle pivot; and
  b) in the seating position and/or functional position, the run-up surface of the cam abuts against the toggle link.
10. Vehicle seat according to claim 9, wherein:
  a) the cam and the first toggle lever are hinged to the backrest part, the second toggle lever is hinged to the coupling rocker, and the cam is pretensioned in a rotational direction by a spring apparatus in such a way that the run-up surface of the cam having an increasing radius is pushed toward the toggle link configuration.
11. Vehicle seat according to claim 9 wherein:
  a) the cam has an indentation on its periphery for accommodating the toggle link configuration upon pivoting forward from the seating position;
  b) in a middle position when the vehicle seat pivots forward from the seating position, the toggle link configuration enters the indentation and moves the cam against its spring tension; and
  c) in a subsequent, intermediate position in the transition into the functional position, the toggle link configuration moves out of the indentation while releasing the cam for subsequent resetting of the cam with relaxation of its spring apparatus, and for abutment of the toggle link configuration against the run-up surface of the cam.
12. Vehicle seat according to claim 1, wherein:
  a) after the rear foot of the vehicle seat is unlocked from the longitudinal rail by the user, the vehicle seat is forwardly pivotable with assistance by the compensation spring, until reaching a middle position, and is subsequently adjustable from the middle position into the functional position with assistance by the compensation spring.
13. Vehicle seat according to claim 1, wherein:
  a) the locking apparatus locks together the at least two link parts by clamping.
14. Vehicle seat according to claim 1, wherein:
  a) the locking apparatus is configured for locking between the backrest part and the coupling rocker.
15. Vehicle seat according to claim 1, wherein:
  a) the compensation spring is provided between the seat part and the coupling rocker.
16. Vehicle seat according to claim 1, wherein:
  a) the front foot is lockable in at least one longitudinal position by the locking apparatus.

17. Vehicle seat according to claim 1, wherein:
a) the rear foot is formed or rigidly mounted on the backrest part.

18. Vehicle seat, comprising:
a) a front foot, a rear foot, a four-link configuration having four link parts which are coupled to one another via four hinge points, and via a compensation spring;
b) the vehicle seat having a locking apparatus which automatically locks together at least two link parts of the four-link configuration;
c) the front foot and the rear foot being accommodated in a longitudinal rail in a longitudinally adjustable manner, and the rear foot being releasable from the longitudinal rail after unlocking of the locking apparatus;
d) the vehicle seat being movable forward from a seating position having a locked rear foot, after the rear foot is unlocked, into a functional position with adjustment of the four-link configuration, and with assistance from the compensation spring;
e) the locking apparatus has:
   i) a cam which is hinged to a link part of the four-link configuration and which has a radially increasing run-up surface on its outer side in a peripheral direction; and
   ii) a toggle pivot, and a toggle link configuration having a first toggle lever and a second toggle lever which are articulatedly connected to one another at the toggle pivot; and
f) in the seating position and/or functional position, the run-up surface of the cam abuts against the toggle link.

19. Vehicle seat, comprising:
a) a front foot, a rear foot, a four-link configuration having four link parts which are coupled to one another via four hinge points, and via a compensation spring;
b) the vehicle seat having a locking apparatus which automatically locks together at least two link parts of the four-link configuration;
c) the front foot and the rear foot being accommodated in a longitudinal rail in a longitudinally adjustable manner, and the rear foot being releasable from the longitudinal rail after unlocking of the locking apparatus;
d) the vehicle seat being movable forward from a seating position having a locked rear foot, after the rear foot is unlocked, into a functional position with adjustment of the four-link configuration, and with assistance from the compensation spring; and
e) tolerances of the locking apparatus of the rear foot on the longitudinal rail and/or tolerances of the longitudinal lock of the front foot on the longitudinal rail, under the action of the compensation spring, result in an adjustment of the locking apparatus and a pivot motion of the receiving part on the front foot.

20. Vehicle seat, comprising:
a) a front foot, a rear foot, a four-link configuration having four link parts which are coupled to one another via four hinge points, and via a compensation spring;
b) the vehicle seat having a locking apparatus which automatically locks together at least two link parts of the four-link configuration;
c) the front foot and the rear foot being accommodated in a longitudinal rail in a longitudinally adjustable manner, and the rear foot being releasable from the longitudinal rail after unlocking of the locking apparatus;
d) the vehicle seat being movable forward from a seating position having a locked rear foot, after the rear foot is unlocked, into a functional position with adjustment of the four-link configuration, and with assistance from the compensation spring;
e) after the rear foot of the vehicle seat is unlocked from the longitudinal rail by the user, the vehicle seat is forwardly pivotable with assistance by the compensation spring, until reaching a middle position, and is subsequently adjustable from the middle position into the functional position with assistance by the compensation spring.

* * * * *